(No Model.)  7 Sheets—Sheet 2.
H. WYMAN & C. CROMPTON.
LOOM.
No. 600,053.  Patented Mar. 1, 1898.

Witnesses.  
Fred S. Greenleaf.  
Thomas J. Drummond.

Inventors  
Horace Wyman.  
Charles Crompton.  
by Crosby & Gregory attys.

(No Model.)

H. WYMAN & C. CROMPTON.
LOOM.

No. 600,053. Patented Mar. 1, 1898.

(No Model.)

H. WYMAN & C. CROMPTON.
LOOM.

No. 600,053. Patented Mar. 1, 1898.

Fig. 3.

Witnesses
Fred S. Greenleaf
Thomas J. Drummond

Inventors
Horace Wyman.
Charles Crompton.
By Crosby & Gregory
attys.

(No Model.)　　　H. WYMAN & C. CROMPTON.　　7 Sheets—Sheet 5.
LOOM.
No. 600,053.　　　　　　　Patented Mar. 1, 1898.

Witnesses.　　　　　　　Inventors
Fred S. Greenleaf.　　　　Horace Wyman.
Thomas J. Drummond.　　Charles Crompton.
　　　　　　　　　　by Crosby Gregory, Attys.

(No Model.) 7 Sheets—Sheet 7.

H. WYMAN & C. CROMPTON.
LOOM.

No. 600,053. Patented Mar. 1, 1898.

Witnesses.
Fred S. Greenleaf.
Thomas J. Drummond.

Inventors.
Horace Wyman.
Charles Crompton.
By Crosby & Gregory, Attys.

THE NORRIS PETERS CO., PHOTO-LITHO., WASHINGTON, D. C.

UNITED STATES PATENT OFFICE.

HORACE WYMAN AND CHARLES CROMPTON, OF WORCESTER, MASSACHUSETTS, ASSIGNORS TO THE CROMPTON LOOM WORKS, OF SAME PLACE.

LOOM.

SPECIFICATION forming part of Letters Patent No. 600,053, dated March 1, 1898.

Application filed July 3, 1896. Serial No. 597,975. (No model.)

*To all whom it may concern:*

Be it known that we, HORACE WYMAN and CHARLES CROMPTON, of Worcester, in the county of Worcester and State of Massachusetts, have invented an Improvement in Looms, of which the following description, in connection with the accompanying drawings, is a specification, like letters and numerals on the drawings representing like parts.

This invention has for its object to improve that class of looms employing shifting shuttle-boxes, whereby when the filling is exhausted or broken a fresh supply of filling will be automatically inserted in the shuttle and the filling-carrier previously in the shuttle will be ejected. We have effected this object in the manner in which we have herein chosen to illustrate our invention by providing the usual lay having a plurality of shuttle-boxes, and actuating mechanism therefor, with a feeder to contain a series of filling-carriers, a transferrer, and means to actuate it to cause the transferrer to take a filling-carrier from the filling-feeder and put it into the shuttle in which the fault in the filling occurred.

Our filling-feeder is shown as a circularly-movable device having holders to retain the filling-carriers at their ends, and the filling-carriers are arranged in groups, each group containing filling-carriers having differing filling, corresponding, however, with the filling used in the series of shuttles, and the feeder is moved positively and in unison with each change of position of the shuttle-boxes to thus place and keep opposite the transferrer a filling-carrier having a filling corresponding with the filling in the shuttle being then put through the shed, and in case of failure of filling in the shuttle, so that a filling-carrier has to be put into the shuttle, the feeder after the filling-carrier has been put from it into the shuttle is given automatically a movement sufficient to bring into operative position a new group of filling-carriers and place opposite the transferrer that one of the said filling-carriers in the new group which has a filling corresponding with the filling just removed from the feeder and put into the shuttle. The filling-feeder has thus imparted to it differential movements as to distances, and it is both oscillated and rotated as necessity requires, and its oscillations are made positive and in unison with the shifting shuttle-box, so that a shuttle containing filling of the required color having been put into the shuttle-box cell and filling-carriers having filling of corresponding color having been put into the filling-feeder in groups after the order of the arrangement of colors in the shifting boxes the feeder will be moved in unison with the shifting shuttle-boxes, so as to always present a filling-carrier opposite or in line with the shuttle then in use as it reaches the end of its flight from the cell of the shifting shuttle-box, so that in case of failure of the filling in the shuttle the latter will be supplied automatically with a new and proper filling-carrier.

In the operation of the loom, in case of a fault in the filling whereby it is not laid in front of the reed preparatory to the forward beat of the lay, the filling-fork is not actuated, but is left in position to be acted upon by the usual knock-off hammer, which hammer gives to the filling-fork slide a partial movement—a movement sufficient, however, to, through suitable mechanism, actuate a stop-rod, causing it not only to throw out of operative position the take-up pawl, but also to render inoperative the devices employed for moving the pattern-surface, this being necessary in the manner in which we have herein illustrated our invention, because the transferrer is not actuated until the second beat of the lay following that in which the fault in the filling occurs, and the shuttle in which the fault in the filling occurred is again in position opposite the transferrer and the filling-feeder.

The filling-fork slide, as we have illustrated our invention, is provided with a catch which at the first backward movement of the slide engages the hook, which hook is moved at the second forward beat of the lay by means of a second cam and devices actuated by it to complete the backward movement of the filling-fork slide and impart further additional movement to the so-called "stop-rod," putting a finger thereon in front of a bunter connected to the lay, so that said bunter will strike the finger and cause the latter, acting on an arm of the transferrer, to actuate the transferrer and put a filling-carrier in the shuttle, knocking the filling-carrier then in the shuttle out.

Prior to our invention we believe the work we have aimed herein to accomplish was never before effected or even attempted, and we therefore do not intend to limit our invention to the exact mechanism or means herein shown for doing this work, as it will be obvious to those skilled in the art that various mechanical devices might be devised without the exercise of invention for bringing the filling-carriers into position to be used when needed and for transferring said carriers into the shuttle; nor is this invention limited to the particular shifting shuttle-box mechanism herein shown, for instead of it we might use any other usual or well-known shifting shuttle-box mechanism containing two or more or any desired or usual number of cells.

We believe that we are the first to use in a loom containing a series of shuttles under the control of a pattern-surface to present at the shed a shuttle having the desired differing filling an apparatus by which to provide said shuttles automatically with like filling, to thus avoid stopping the loom when filling is to be supplied to a shuttle, and we also believe ourselves to be the first by or through a pattern-surface and suitable devices to move positively a filling-feeder having filling of different colors, so that a filling of the desired color may be put, at the call of the pattern-surface, in position to be removed from the feeder and put into a shuttle then in place to receive it.

Fig. 2$^a$ shows the opposite end of the pattern-cylinder shaft $h^3$ and part of the device for moving it. Fig. 7$^a$ is a detail showing the filling-feeder in perspective. Fig. 12 is a modification to be referred to.

Figure 1:
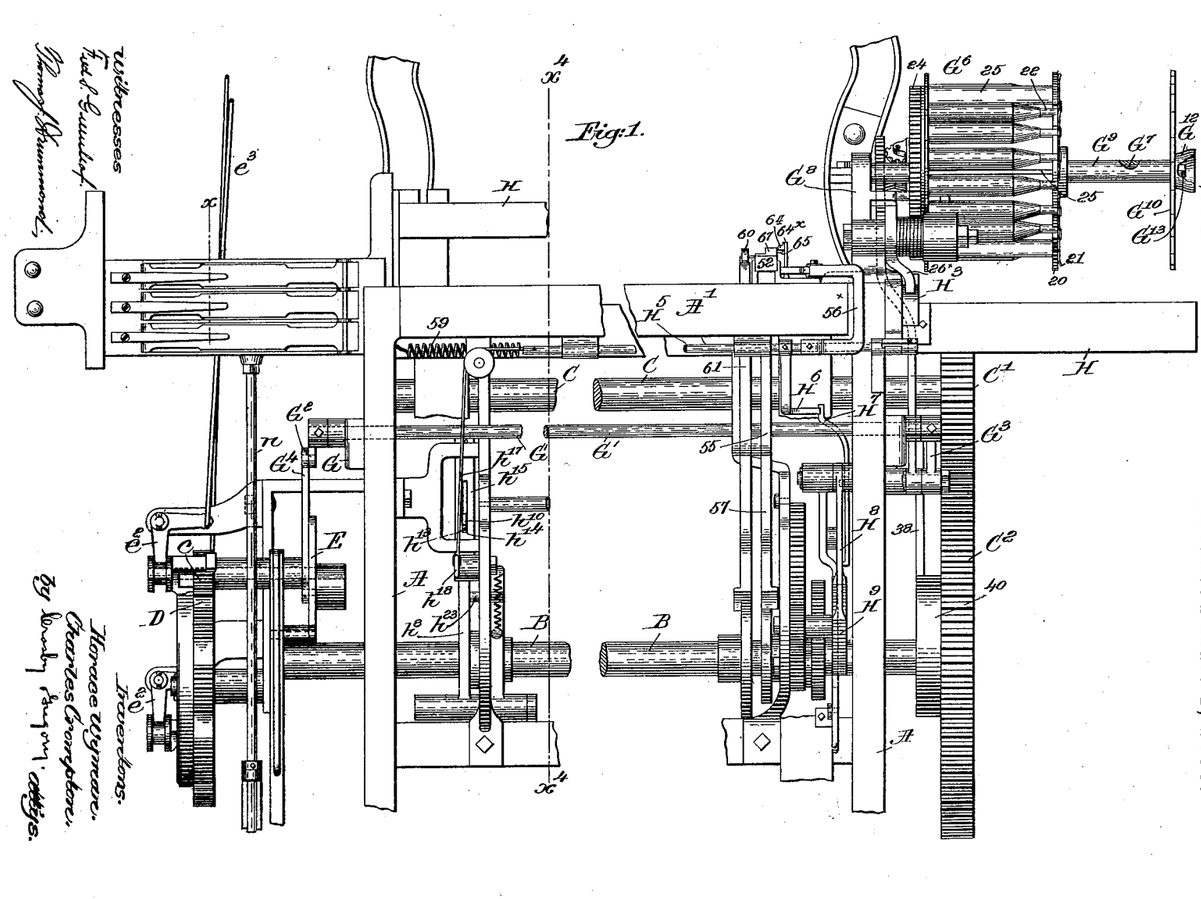
Figure 1, in front elevation, represents a sufficient portion of a loom to illustrate our invention, the central part of the loom and its driving-pulleys being omitted from the crank-shaft, together with the shed-forming mechanism.

The loom-frame A, the crank-shaft C, having a gear C' engaging a gear C$^2$ on the lower or cam shaft B, the latter having an arm provided with a stud $a$, engaging intermittingly slots in the master-wheel D, the pinions $c$ and $d$, actuated intermittingly by the teeth of the master-gear, the shafts $c^2$ and $d^2$, on which the said pinions are splined, the said pinions being fast on the shafts and having coöperating with them movable teeth which derive their motion through levers $e^2$, operatively connected by rods $e^3$ $g^3$ with suitable fingers $e^4$, resting upon a pattern surface or chain $e^5$, the lay H, actuated from the crank-shaft by suitable connecting-rods H', the shuttle-box rod $n$, having at its upper end a series of, as herein shown, shuttle-boxes presenting three cells, and the shuttle-box lever E, suitably connected, as by a rod $n^2$, having a slip-joint attached to the shuttle-rod, are and may be all substantially as represented in United States Patent No. 364,697, wherein the shuttle-box mechanism is fully described and illustrated, the parts of the shuttle-box not herein shown, but which will in practice be used in our improved loom, being therein fully shown and described, like letters and numerals being used.

Figure 2:
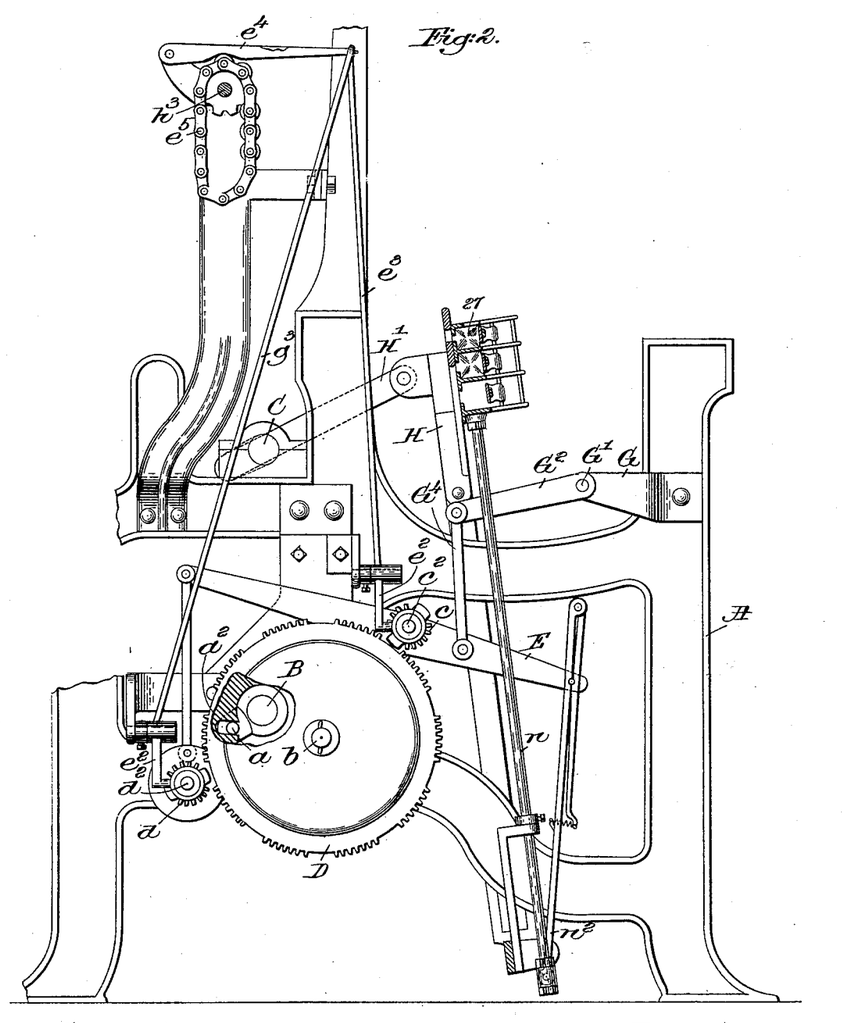
Fig. 2 is a section in the line $x$, Fig. 1, looking to the right, showing the parts at that end of the loom, together with the pattern-surface.
Figure 2A:
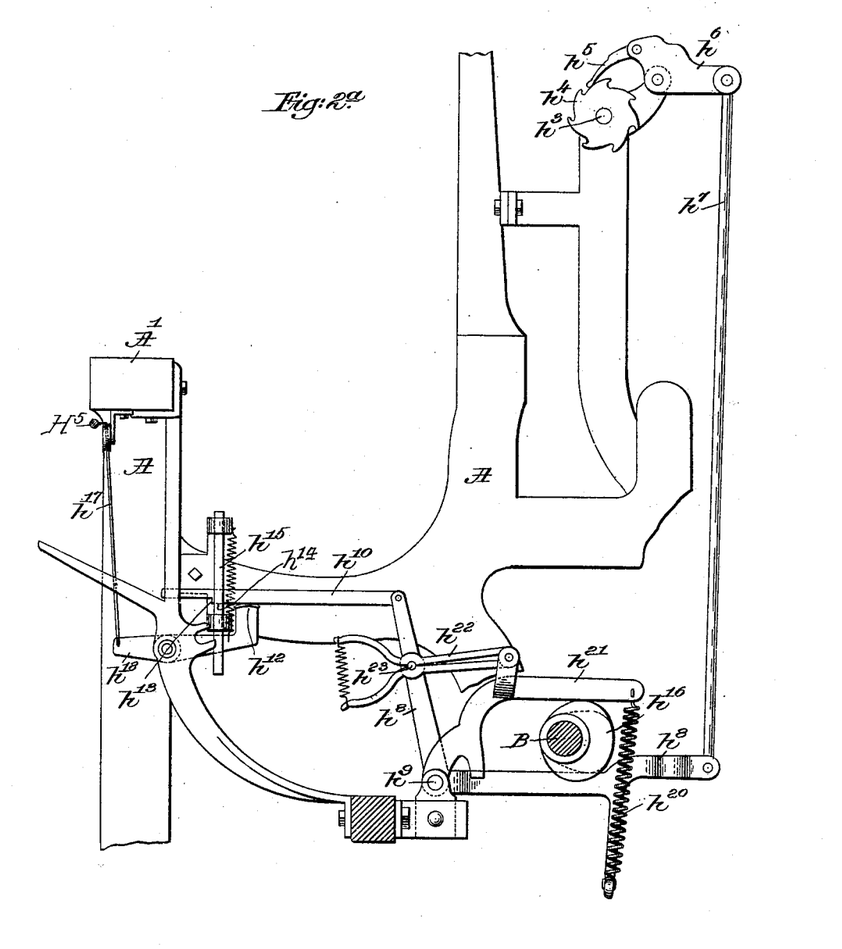

The pattern-surface surrounds a pattern-shaft $h^3$, having at its inner end a ratchet-wheel $h^4$, which is engaged by a pawl $h^5$, pivoted on a pawl-carrier $h^6$, having an attached rod $h^7$, jointed to the end of an elbow-lever $h^8$, pivoted at $h^9$ and provided at its upper end with a latch $h^{10}$, which lies on a rest $h^{12}$, thus keeping the shoulder $h^{13}$ of the latch elevated, so that it will not strike the shoulder $h^{14}$ of the guide $h^{15}$ so long as the loom is working regularly, and the cam $h^{16}$ is to move the pattern-cylinder. In case the filling fails the sliding rod H$^5$, to be described, will be moved to the right, and by its flexible connection $h^{17}$, attached to the lever $h^{18}$, carrying the rest $h^{12}$, will lower the rest and permit said shoulder $h^{13}$ to meet the shoulder $h^{14}$, which will prevent the forward sliding movement of said latch and leave the lever $h^8$ at the outward limit of its stroke under the action of its cam. The lever $h^8$ is normally held toward its actuating-cam by a spring $h^{20}$, connected to it and to a lever $h^{21}$, pivoted at $h^9$, said lever $h^{21}$ having a slip connection $h^{22}$, which engages a pin $h^{23}$ on the lever $h^8$; but whenever the latch is permitted to engage the stop $h^{14}$ the movement of the lever $h^8$ and the pattern-surface for the shuttle-box mechanism is stopped and the cam $h^{16}$ continues to rotate and move the lever $h^{21}$, the slip device $h^{22}$ then slipping on the pin $h^{23}$, thus preventing the breaking of the parts and allowing the pattern-surface to stand still, this stopping of the pattern-surface being effected preparatory to operating the pusher, so that the pattern-surface will remain in proper relation to the other working parts.

Our invention does not relate particularly to the shuttle-box mechanism, and, as we have said, instead of the particular mechanism referred to we may employ any other well-known or suitable shuttle-box mechanism.

The shuttle-box lever E in this illustration of our invention has been chosen as the device of the shuttle-box mechanism with which we make the connection to actuate the filling-carrier to be described, said lever being under the control of a pattern-surface.

The frame of the loom is provided with suitable brackets G, which receive a rock-shaft G', having two arms $G^2$ $G^3$, the arm $G^2$ being connected by link $G^4$ with the shuttle-box lever E. The arm $G^3$ of the rock-shaft has connected to it a rack-bar $G^5$, the said link, rock-shaft, arms, and rack constituting means for actuating a system of epicycloidal gearing for moving the filling-carrier feeder $G^6$ backward and forward in unison with the rising and falling movements of the shuttle-box.

Figure 7:
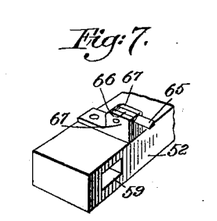
Fig. 7 is a detail showing part of the filling-fork slide.
Figure 7A:
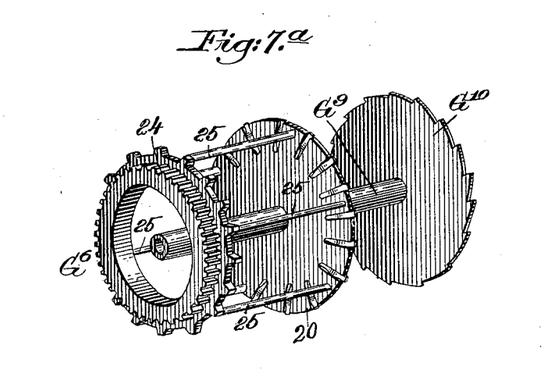
Figure 8:
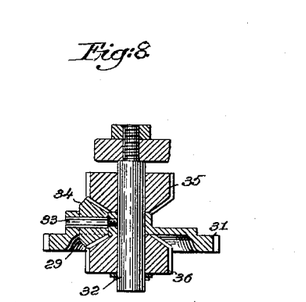
Fig. 8 is a section taken through the gears on the stud 32.
Figure 9:
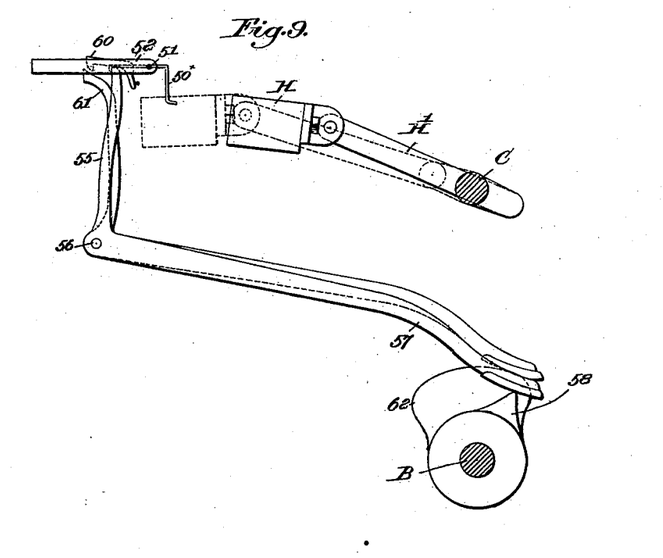
Fig. 9 is a detail relating to the filling-fork mechanism.

The filling-feeder $G^6$, (see Fig. 7$^a$,) where the same is shown detached, as herein represented, consists of a substantially circular cage composed of a hollow hub $G^{6\times}$, provided at one end with a circular head 20, having extended horizontally from it, parallel to said hub, a series of arms or fins 25, said arms or fins at their end farthest from said head being connected to and supporting the toothed ring 24.

The hollow hub $G^{6\times}$ of the filling-feeder is supported on a stud $G^7$, extended horizontally from one side of a stand $G^8$, fixed on the breast-beam A' of the loom-frame, the said hub being prolonged outside the head 20 by a second sleeve $G^9$, connected to the outer side of said head, and to the said sleeve $G^9$ is connected a filling-end support $G^{10}$ and a filling-end holder $G^{12}$, the filling-feeder being kept on the said stud by a suitable bolt $G^{13}$. (See Fig. 1.)

The head 20 of the filling-feeder has a series of radial notches, in which are located suitable springs 21, one for each notch, and against which springs the tip of a filling-carrier 22 will be placed, while the large or base end of each filling-carrier will be inserted in a pocket 23 of the toothed ring 24.

The series of horizontal arms or fins 25, as herein shown, divide the feeder into compartments.

The internal diameter of the toothed ring 24 is such that the acting end of the transferrer 26, to be hereinafter described, may enter and be moved freely therein, said transferrer when made to descend striking the filling-carrier then under it and ejecting said filling-carrier from the feeder into the shuttle 27 then in the shuttle-box below the feeder, this action taking place whenever a fault occurs in the filling-carrier then in the shuttle, but after such shuttle has arrived in the shuttle-box which is located under the said feeder, said shuttle-box being fixed to that end of the lay farthest from the shifting shuttle-boxes.

Figure 10:
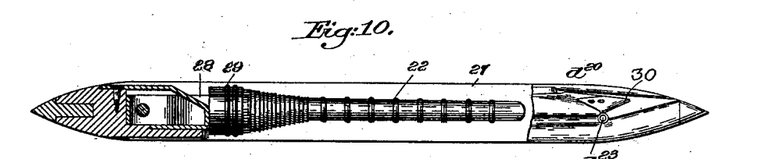
Fig. 10 is a plan view of a self-threading shuttle.
Figure 11:
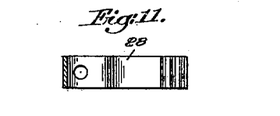
Fig. 11 shows one of the holders 28 detached.

The shuttle 27, Fig. 10, is of that variety wherein there is a passage through it from one side to the other side in order that the filling-carrier put into it at one side may be ejected from it at the opposite side, the said shuttle having suitable filling-carrier holders 28 of such shape as to receive rings or projections 29 of the filling-carriers 22, the shuttle also having a self or automatic threading contrivance comprehending a slot $d^{20}$ and a horn 30, which may be of any of the usual forms of construction, so that when a filling-carrier in the filling-carrier feeder, said filling-carrier having the end of its thread connected with the holder $G^{12}$, is put by the transferrer or pusher into the shuttle, that movement ejecting the filling-carrier then in the shuttle through the shuttle and out from the bottom of the lay, the thread of said filling-carrier as the shuttle is thrown through the shed will be automatically threaded into the slot $d^{20}$ and delivery-eye $d^{23}$ of the self-threading contrivance of the shuttle, so that the shuttle will correctly deliver the filling from it into the shed.

The filling-feeder herein described and the transferrer and the shuttle having the self-threading contrivance are in operation substantially the same as described in certain United States patents granted to James H. Northrop, No. 529,940, and G. O. Draper, No. 538,507; but in order to enable a shifting-shuttle-box loom to have its shuttles automatically supplied with filling-carriers on the failure of the weft we have had to modify the construction of the filling-carrier feeder and the transferrer and have devised novel actuating means for the same, which we will hereinafter describe, for in our invention the filling-carrier feeder must oscillate or move in unison with the shifting shuttle-boxes, and it must also at times have a motion of rotation to bring into operative position a filling-carrier having a filling of a certain color after a filling-carrier having a filling of the same color has been removed from the feeder.

The filling-carriers are arranged in the filling-feeder in groups, and inasmuch as we have herein represented a shifting shuttle-box with three cells the groups of filling-carriers are made of three each, each group of filling-carriers being provided with differing filling or filling of different colors—as, for instance, red, white, and blue—and these groups are repeated, as herein shown, six times, and the shuttles in the cells of the shifting shuttle-boxes have on starting of the loom filling-carriers having filling of the colors red, white, and blue.

The teeth of the toothed ring 24 of the filling-feeder are engaged by the teeth of a gear 31, mounted loosely on a stud 32, the said gear having, however, peculiar movements, as we will now describe.

The gear 31 has connected to it a stud 33, on which is loosely mounted a bevel-pinion 34, the said bevel-pinion being engaged by the bevel-teeth of a gear 35, loose on the said stud and engaged by the teeth of the rack $G^5$, before described, said bevel-pinion 34 also engaging the bevel-teeth of and moving a gear 36, also loose on said stud, the bevel-pinion 34 connecting the said two gears 35 and 36. The teeth of the loose gear 36 are in mesh with a gear $32^\times$, having an attached ratchet-wheel $33^\times$, which may be moved intermittingly in one direction only by a pawl $34^\times$. The gear 31 may therefore be moved from two sources—that is, it may be oscillated by the rack $G^5$, gear 35, and bevel-pinion 34, the gear 36 being then held fast, or it may be rotated from the gear $32^\times$, as will be described, the rack and gear 35 being then held fast. The pawl $34^\times$ is attached to a pawl-carrier $35^\times$, mounted on a stud 36, the pawl-carrier having connected to its lower end a rod 37, attached to a lever 38, having its fulcrum at 39 and acted upon by a cam 40 on the lower cam-shaft B, the said pawl thus having a constant motion; but the pawl cannot engage the ratchet-wheel except when a filling-carrier is to be ejected from the shuttle and a new one put into the said shuttle. Let it be supposed that a shuttle-box having a red filling is in position at the level of the race of the lay and is working, and in such position the red filling in a group of filling-carriers is stopped immediately below the end of the pusher, and so long as that red filling goes in and the shuttle-boxes are not shifted the red-filling carrier stands in that position and the rack $G^5$ stands still, but if the second shuttle from the red-filling shuttle—viz., the one containing blue—should be brought into position by shifting the shuttle-box lever in usual manner then that movement of the shuttle-box lever through the operative mechanism connecting it with the rack $G^5$ moves the said rack and effects the turning of the filling-feeder far enough to skip over the white-filling carrier therein and bring the blue-carrier in position below the pusher, and then in case the white-shuttle between the red and the blue were to be put into position and the shuttle-box shifted for that purpose one step the movement of the said shuttle-box lever through the connections described would reverse the movement of the filling-feeder and bring the white filling located between the red and the blue underneath the transferrer, so that it will be understood that the filling-feeder has an oscillating motion in extent dependent upon the motion of the shifting shuttle-boxes, and whatever the movement of the shuttle-boxes the filling-feeder has a corresponding movement, so as to always preserve the proper relative arrangement of colors. Now in case of a fault in a filling-carrier in the shuttle the transferrer will be operated, as will be described, and it will descend and push out from the filling-feeder a filling-carrier having a filling of a color corresponding with that in the shuttle in which new filling is to be placed, and then thereafter comes in the new or second movement of the filling-feeder. One filling-carrier having been exhausted from a group of filling-carriers another group of filling-carriers must be instantly brought into position, wherein all the colors are represented, in order that should the same color be next required to be taken from the filling-carrier feeder there would be under the transferrer a filling-carrier having a filling of the proper color.

The second motion referred to constitutes what we designate as the "rotary motion" of the filling-feeder. To effect this rotary motion of the filling-feeder, which is always in one direction, we let come into play the pawl $34^\times$ and in the following manner, viz: The outer end of the pawl $34^\times$, (see Fig. 4,) attached to the elbow-lever $35^\times$, pivoted on the stud 36, lies normally on and is reciprocated backward and forward over a pawl-lifter $41^\times$ and a pawl-rest $40^\times$, but normally the pawl is not moved off from the said rest, and it cannot, consequently, engage the teeth of the ratchet $33^\times$ to turn it. The pawl-lifter $41^\times$ is pivotally mounted upon the pawl-rest $40^\times$, shown as a second elbow-lever mounted upon the stud 36 outside the lever $35^\times$, one arm of said pawl-rest being shown as provided with an adjustable stud 42, which is embraced by the slotted end of a pawl-rest controller 43, shown as a lever having its fulcrum on a stud 44, projected from the stand $G^8$, the opposite end of said controller being also shown as forked (see Fig. 3) and as embracing a pin 45, carried by the transferrer 26. The transferrer-carrying arm $26^a$ is mounted upon a stud 47, secured to the fixed stand $G^8$, and said arm is offset near its free end, as shown at $26^b$, to thus enable it to pass through the gear 23 and support its acting end or portion, which acts on the filling-carriers above the said carriers. The stud 47 has wound about it a suitable strong spiral spring 48, the free end of which engages the transferrer-carrying arm, while the opposite end of said spring is fixed with relation to the stud, the said spring normally keeping the transferrer 26 elevated, so that the filling-carriers held in the feeder in the movement of the latter may readily pass under the acting end of the transferrer. The transferrer has a short arm $26^\times$, (see Fig. 3,) and the lay-beam has an attached bunter $H^3$, and whenever a finger $H^4$, attached to a sliding rod $H^5$, having suitable bearings under the breast-beam, is moved—in this instance of our invention to the right, Fig. 1—far enough to put said finger in the path of the bunter the lay, as it comes forward, causes the bunter to act on the finger and give the latter a quick movement, causing the finger to act on the arm $26^\times$ and move the transferrer-carrying arm and cause the connected transferrer to act on and push the filling-carrier, then under it, from the filling-feeder into the shuttle, then in the stationary box, the incoming filling-carrier meeting and ejecting the spent filling-carrier from the shuttle. In order that the gear $32^\times$ may not be moved farther than required, we have provided a suitable locking-lever 49, (see Fig.

Figure 3:
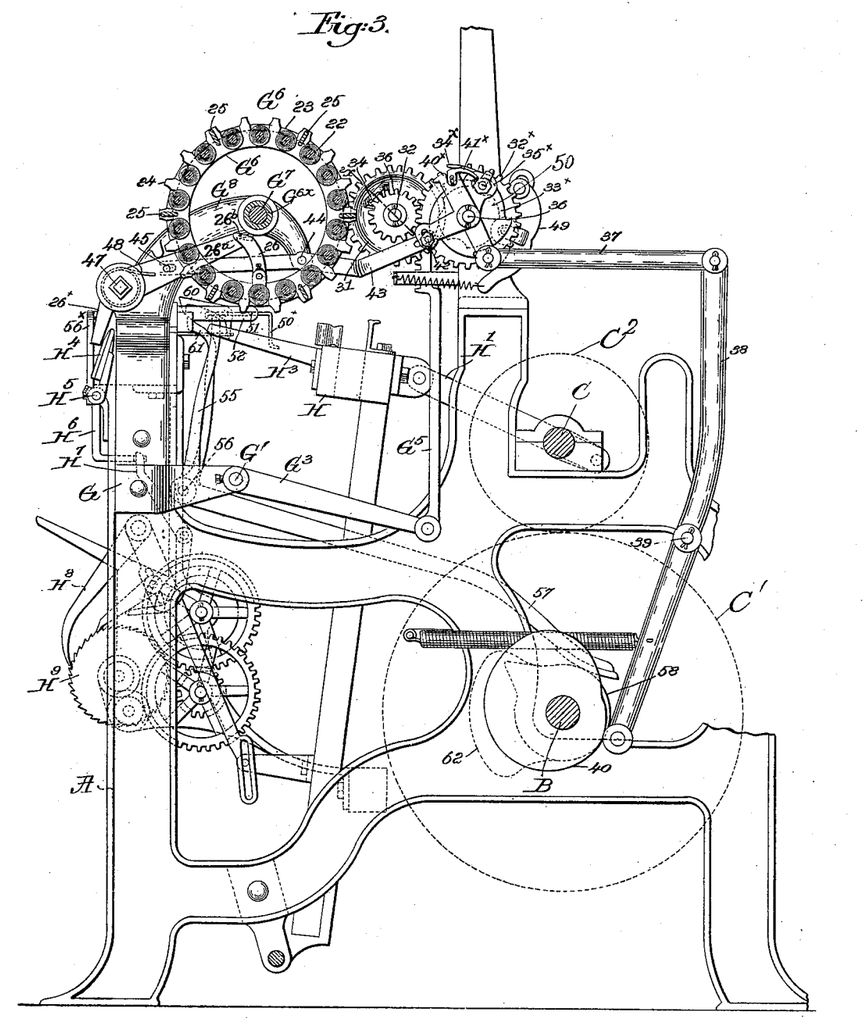
Fig. 3 is a section in the line $x'$, Fig. 1, showing the filling-feeder provided with filling, the means for operating it, and the transferrer or "pusher," as it is sometimes called.
Figure 4:
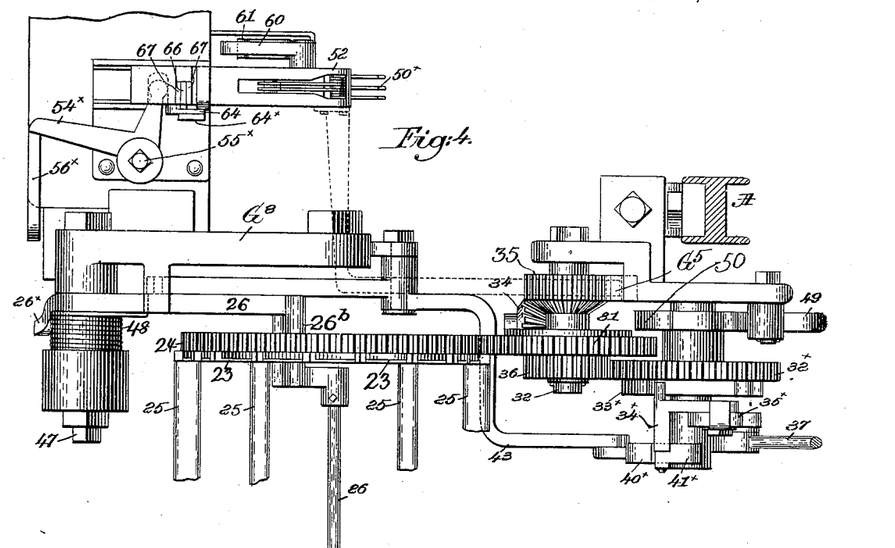
Fig. 4 is a partial plan view of the right-hand end of the loom, with the filling-feeder partially broken away.
Figure 5:
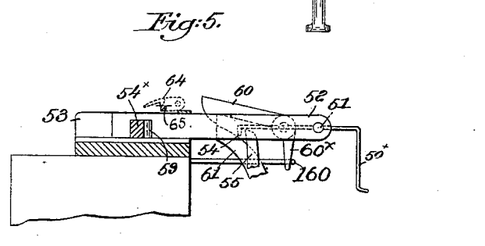
Fig. 5 is a detail of the filling-fork mechanism.
Figure 6:
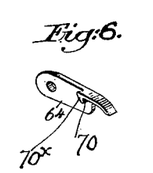
Fig. 6 is a detail of the catch.

3,) having a roll (shown in that figure by dotted lines) which enters notches in a notched wheel 50, also shown by dotted lines. While the transferrer is descending to act upon and remove a filling-carrier from the filling-feeder, the lever 43 is moved sufficiently to turn the pawl-rest $40^\times$ a little to the right, so that as the pawl $34^\times$ is again moved forward it slips over the end of the said rest, drops into engagement with a tooth of the ratchet-wheel $33^\times$ and gives it a quick movement, the said movement taking place, however, after the transferrer has effected its work, the movement being sufficient to move the filling-feeder for a distance equal to the space occupied by one group of filling, so that a filling-carrier of the same color may be brought into operative position under the transferrer after a filling-carrier has been ejected from the feeder, or, in other words, the filling-carrier, which is brought by the movement of the feeder, due to the ratchet referred to, in position under the transferrer, will always be of the same color as that on the filling-carrier which was just removed from the feeder by the transferrer. In practice the gears 36 and $32^\times$ will be in such proportion as to size and the ratchet-teeth of the gear $32^\times$ will be in such number as to give to the filling-feeder the desired extent of movement, that depending upon the number of colors used in the filling-feeder and the number of shuttle-boxes employed at the opposite end of the loom. This proportion may be varied at will, according to the number of colors and the work to be done. The pawl $34^\times$ having reached the end of its back stroke, it having moved the ratchet, again starts forward in the regular movement of the pawl, and the finger projecting from the pawl strikes the free end of the pivoted pawl-lifter $41^\times$, said end being downturned, so that it catches under and lifts the pawl from engagement with the ratchet and enables it to slide back and forth on the pawl-rest $40^\times$ until the transferrer is again operated. The movement of the transferrer is dependent upon, as herein shown, the failure of the weft, and the filling-fork is made instrumental in starting it. The filling-fork $50^\times$ is pivoted at 51 on a slide 52, which is adapted to be reciprocated in a stand 53, fixed to the breast-beam, the filling-fork having at its inner end the usual projection 54, (see Fig. 5,) which drops when the filling is absent from in front of the weft-fork as the lay beats forward, so that said end 54 is caught by the upper end of the filling-hammer 55, it being shown as a lever pivoted at 56 and having an arm 57, which is acted upon by a suitable cam 58 on the shaft B, all in usual manner. The filling-fork slide has a notch 59, as herein shown, at its side, which receives one end of an elbow-lever $54^\times$, pivoted at $55^\times$, and when the filling-fork slide is pushed back by the filling-fork hammer it moves the elbow-lever so that its outer end acts on a finger $56^\times$, attached to the slide-rod $H^5$, and slides the said rod far enough to cause a projection $H^6$, shown as having a bevel or cam-shaped end, to act upon the upper end of a lever $H^7$ and turn it to lift the take-up pawl $H^8$ from engagement with the ratchet-wheel $H^9$ of the take-up mechanism, which may be of any suitable or usual construction, this being done before operating the transferrer to immediately suspend the operation of the take-up until after the filling change shall have been effected. This rod is normally pulled, as herein shown, to the left by a spring 59, attached to it and the loom-frame, and the said rod having jointed to it the suitable flexible connections $h^{17}$, before described, to at the same time effect the stopping of the pattern surface or chain. The filling-fork is actuated by the weft-hammer after the failure of the filling immediately as the shuttle goes in the right-hand box and while the lay is moving forward, and as the lay next goes back the shuttle in which there is a fault is thrown back into the shifting shuttle-box from which it came and the filling-hammer is retracted; but the filling-fork slide does not follow the lay, for it is locked by a locking device, (shown in Fig. 6,) it consisting, essentially, of a catch 64, pivoted on a stand $64^\times$ of the breast-beam, said locking device having an incline $70^\times$, which is acted upon by a projection 65, extended from a finger 66, pivoted upon the top of the weft-fork slide between ears 67, the said projection slightly lifting said catch, and the latter then drops with its shoulder 70 behind the said projection, thus preventing the return of the filling-fork with the lay. The filling-fork slide has pivoted to it on its left-hand side a latch 60, which, as the said slide is carried back, as described, by the hammer 55, drops behind the upper end of the lever 61, pivoted at 56, the said upper end being then in its position farthest from the breast-beam and the lay completing its back stroke, and the shuttle in which the filling was broken or absent is at such times thrown back into the shifting shuttle-box. The lay is then again started forward a second time and is returned back again, and on its back stroke, the shuttle having the exhausted filling, is again thrown into the shuttle-box under the feeder and the lay again starts forward for the third time, and at this stroke, the shuttle being in condition to be replenished with a new filling-carrier, the upper end of the lever 61 is moved forward by the cam 62 and, engaging the latch 60, imparts to the filling-fork slide its additional or full movement. This additional or full movement of the filling-fork slide causes the lever $54^\times$ to be further moved to slide the rod $H^5$ far enough to put the finger $H^4$, carried thereby, between the transferrer end $26^\times$ and the bunter, so that the latter, as the lay reaches its forward position, hits the said finger $H^4$ and moves it, so that said finger, meeting the end $26^\times$, actuates the transferrer to take a filling-carrier from the filling-carrier feeder and put it into the shuttle then in the shuttle-box, the lay then going back again, the filling-fork slide resuming its original or normal position. As the filling-fork slide is given its additional or further movement outwardly, as described, to accomplish the movement of the transferrer, as referred to, the projection 65 on the pivoted finger 66 passes under and beyond the locking device or catch 64, and the transferrer having been moved to put a filling-carrier into the shuttle, the upper end of the lever 61 engaging the latch 60, is permitted by its cam to move backwardly away from the breast-beam, and the filling-fork slide, under the stress of the spring 59, is moved forwardly and the finger 56 strikes the top of the catch at its down-turned outer end and slides over the catch and drops back of the incline 70$^\times$. As the upper end of the lever 61 moves away from the breast-beam after having effected the operation of the pusher, as described, the latch 60 and slide-bar 52 move with the lever until the short arm 60$^\times$ of the latch meets the stop 160, (see Fig. 5,) when the said latch is turned to free its notched end from the lever 61, said stop thereafter keeping the hooked end of the latch elevated above the path of movement of the said lever 61 until the filling again breaks and the filling-fork slide is again moved, as before.

From the foregoing description it will be understood that the position of the filling-fork slide determines the time of operation of the transferrer, and should the said slide be put into its farthest outward position at that forward beat of the lay at which the absence of the filling was detected the shuttle would not then be in the box under the feeder, but would probably be in the shuttle-box. Hence the full outward movement of the slide is effected only at a subsequent beat of the lay after the shuttle to be supplied with filling has surely returned into the shuttle-box under the feeder.

We may employ any other usual form of self-threading shuttle, of which there are many examples.

The open ring-like inner end of the filling-feeder having the teeth to be engaged by the pinion 31 is supported by arms or fins 25, the said fins, as herein shown, forming compartments large enough to receive three filling-carriers corresponding with the shuttle-box; but all the said fins are not needed, and it is not essential to separate the filling-carriers at any particular spot.

Figure 12:
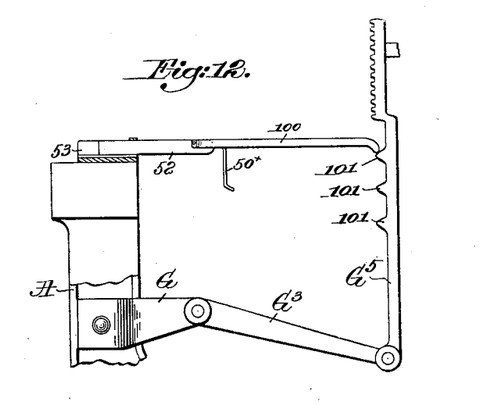

The lever E, controlled by the pattern-chains $e^5$, determines by its movement not only the position of a shuttle having filling of a particular color, but it also determines independently by or through the shaft G' the particular color of the filling on the filling-carriers to stand under the transferrer, and we might therefore dispense with the movable shuttle-box and employ the usual shuttle-box fixed to the lay, and we might then use the lever to move the feeder at stated intervals, according to the requirements of the pattern-chain—that is to say, we may move the feeder and permit the transferrer or pusher to take from it a filling-carrier and use that color for a determined number of picks, and then change the position of the feeder and actuate the transferrer or pusher to put a filling-carrier having a filling of a different color into the shuttle, it remaining therein for a determined number of picks. To do this, it is only necessary to add to the filling-fork slide an arm 100 (see Fig. 12) and provide the rack-carrying rod with three cam projections 101, the said cams acting when the rod is shifted to push the filling-fork slide back in its guiding-stand and effect the movement of the transferrer, as has been described, the filling on the carrier ejected from the shuttle being broken off as it is pushed out, but when the change shuttle-boxes are used the arm 100 will be removed.

Having described our invention, what we claim, and desire to secure by Letters Patent, is—

1. In a loom, a filling-carrier feeder and filling-carriers arranged therein in groups, each group having a plurality of differing fillings, combined with means to actuate said feeder positively for a distance equal to the distance apart of like fillings in the different groups, substantially as described.

2. A filling-carrier feeder having a series of groups of filling-carriers, the carriers of each group having differing fillings, combined with means to positively move said feeder back and forth from one to the other of the filling-carriers of each group, and also to move said feeder over a distance equal to the distance between a filling-carrier in one group to a filling-carrier having like filling in another group of filling-carriers, substantially as described.

3. A filling-feeder having a series of filling-carriers, arranged in groups to present two or more differing fillings, combined with actuating devices to rotate said feeder intermittingly at the desired times, to bring one group of filling-carriers after another into operative position, substantially as described.

4. A filling-feeder provided with a series of filling-carriers arranged in groups to present differing fillings, a plurality of differing fillings in each group, combined with means to operate said feeder from the actuating position of one of the filling-carriers of the one group to any one of the filling-carriers in an adjacent group, substantially as described.

5. A filling-carrier feeder having attached gear-teeth, and provided with a series of filling-carriers, arranged in groups to present filling of different colors, combined with a toothed gear, and means to not only move said feeder to change the position of the individual carriers of the same group, but also to rotate said feeder for a distance equal to the distance between a filling-carrier of a certain color in one group to a filling-carrier of another group, but having the same colored filling, substantially as described.

6. A loom containing the following instrumentalities, viz: a filling-carrier feeder having filling-carriers arranged in groups, each group having differing filling, a shuttle-box to receive a shuttle, a transferrer, and means to actuate said feeder for a distance equal to the distance apart of the threads of like filling in the different groups, and suitable means to actuate the transferrer, for the purposes set forth.

7. A loom containing the following instrumentalities, viz: a transferrer, means to actuate it, and a filling-carrier feeder having filling-carriers arranged in groups, each group having differing filling, a shuttle-box to receive a shuttle, means to actuate said feeder for a distance equal to the distance apart of like filling in the different groups, and to also move said feeder back and forth to place in operative position in connection with said shuttle-box and transferrer, the different carriers of each group, substantially as described.

8. A filling-carrier feeder provided with filling-carriers arranged in groups, each group presenting differing yarns, means to move said feeder for a distance equal to the distance between like yarns in the different groups, combined with a transferrer, and means to operate it on the failure of the filling, the movement of the transferrer determining the time of action of the means for actuating said feeder, as described.

9. A filling-feeder having gear-teeth, a toothed gear in connection therewith, means to oscillate said toothed gear and feeder, combined with independent means to partially rotate said gear, a transferrer, and means to operate it on the failure of the filling, the movement of the transferrer determining the time of action of the means for partially rotating the said gear, substantially as described.

10. A loom containing the following instrumentalities, viz: a lay, a shifting shuttle-box arranged at one end thereof, a series of shuttles coöperating therewith, and adapted each to receive a filling-carrier having differing yarns, means to actuate said shifting shuttle-boxes, a filling-feeder at the opposite end of the lay presenting filling corresponding with that in said shuttle-boxes, and means to actuate said filling-feeder in unison with said shuttle-boxes, whereby the filling-feeder is moved when said shifting shuttle-boxes are moved to always keep opposite the end of the lay next said feeder, a filling-carrier having a filling corresponding with that in the shuttle being then used, substantially as described.

11. A loom containing the following instrumentalities, viz: a lay, shifting shuttle-box mechanism, a filling-carrier feeder, a series of self-threading shuttles, a transferrer to automatically remove a filling-carrier from the feeder and put it into the shuttle, means to actuate the said transferrer, and means to actuate the feeder in unison with the shuttle-box, whereby a filling-carrier having a yarn like that contained in the shuttle then being used may be kept in position to be acted upon by the transferrer, to operate, substantially as described.

12. A series of shuttle-boxes, means to operate the same to bring one shuttle after another into working position, a filling-feeder provided with filling-carriers having differing threads and arranged in groups, a series of self-threading shuttles, a transferrer to automatically transfer a carrier from said feeder into a shuttle, combined with means to both move said feeder back and forth as the said shuttle-boxes are moved to thus always keep in operative position with relation to said transferrer a filling-carrier having a thread like that employed in the shuttle then used, and also to move said feeder for a distance equal to the distance between filling-carriers having like yarns in different groups, substantially as described.

13. A series of shuttle-boxes, actuating means therefor, a filling-carrier feeder provided with a series of filling-carriers arranged in groups to present fillings of different colors, combined with connections between the shuttle-box operative parts and said feeder to oscillate said feeder back and forth to correspond with the changing positions of the said shuttle-box, substantially as described.

14. A series of shuttle-boxes, actuating means therefor, a filling-carrier feeder provided with a series of filling-carriers arranged in groups to present fillings of different colors, combined with connections between the shuttle-box operative parts and said feeder to rotate said feeder for a distance equal to the distance between filling-carriers of the same color in the different groups, substantially as described.

15. A series of shuttle-boxes, actuating means therefor, a filling-carrier feeder provided with a series of filling-carriers arranged in groups to present fillings of different colors, combined with connections between the shuttle-box operative parts and said feeder to oscillate said feeder back and forth to correspond with the changing positions of the said shuttle-box, and means to also effect the rotation of said feeder for a distance equal to the distance between filling-carriers of the same color in the different groups, substantially as described.

16. A filling-carrier feeder having filling-carriers arranged in groups, each group presenting filling differing in color, a shuttle-box to receive a shuttle to be provided with filling, and a transferrer, combined with means to positively move said filling-feeder back and forth to thus keep between the transferrer and the shuttle a filling-carrier having filling of the desired color, substantially as described.

17. A lay, a series of shifting shuttle-boxes, a shuttle-box lever, means to actuate it, and a filling-carrier feeder having a series of filling-carriers provided with filling of different color arranged in a plurality of groups, and a transferrer, combined with means to operatively connect the said shuttle-box lever and the said filling-feeder, whereby a filling-carrier having a filling of the color contained in the shuttle then being used may be kept in position to be acted upon by the said transferrer in case the filling fails, and also to move said filling-feeder, after a filling-carrier has been taken from it, for a sufficient distance to place opposite said transferrer and between it and the shuttle-box a second group of filling-carriers and present in position a filling-carrier having filling of the color just removed from another group, substantially as described.

18. A series of shuttle-boxes, actuating means therefor, and a filling-carrier feeder having a series of filling-carriers, combined with means to operatively connect said shuttle-box-actuating mechanism and said filling-feeder, whereby the said shuttle-boxes and filling-feeder may move in unison while the loom is running and effecting the changes of the shuttle-box, and a transferrer and actuating means therefor, substantially as described.

19. A series of shuttle-boxes, a shuttle-box lever, means to actuate it, and a filling-carrier feeder and a series of filling-carriers provided with filling of different color, the said series arranged in groups in said feeder, and a transferrer to act on said filling-carriers, combined with means to operatively connect said shuttle-box lever and said feeder to oscillate it in unison with the shuttle-boxes during the regular motions of the loom, the shuttles being supplied with unbroken filling, and means to after failure of the filling actuate said transferrer and thereafter turn the said filling-feeder from one to the next group of filling-carriers, substantially as described.

20. A lay having a shuttle-box containing a shuttle, a filling-feeder provided with a series of masses of wound filling and coöperating with said shuttle-box, said feeder having gear-teeth, a toothed gear to engage said teeth, and means to oscillate said toothed gear, causing it to oscillate the feeder, combined with a transferrer and actuating means therefor, to act on said masses of wound filling and remove them from the feeder into said shuttle, substantially as described.

21. In a loom, the following instrumentalities, viz: a lay, a series of shifting shuttle-boxes, means to actuate the same, a pattern-surface to control the order of movement of said shuttle-boxes, means to move said pattern-surface, a transferrer, a filling-fork, its slide, a slide-rod having a finger, means between the said filling-fork slide and said slide-rod to actuate the latter, a bunter carried by the lay, and a filling-carrier feeder, whereby said slide-rod when moved by the filling-fork slide after failure of the filling acts to suspend the action of the pattern-surface and to put said finger into position to be struck by the said bunter to actuate the transferrer, the said pattern-surface being thrown out of operation in advance of the operation of the transferrer, substantially as described.

22. In a loom, the following instrumentalities, viz: a lay having a shuttle-box, and a bunter; a filling-carrier feeder; a transferrer; a filling-fork; a filling-fork slide on which it is mounted; a slide-rod having a flange; means between said filling-fork and said slide-rod to actuate the latter when the filling is absent to put said finger between said bunter and transferrer; a pattern-surface, means to actuate it, and means between the said slide-rod and the means for actuating the said pattern-surface, to temporarily suspend the action of the said pattern-surface after said slide-rod has been moved by the movement of the filling-fork, due to the absence of the filling, substantially as described.

23. In a loom the following instrumentalities, viz: a lay having a shuttle-box adapted to receive a self-threading shuttle provided with a filling-carrier, a filling-carrier feeder having differing filling, arranged in different groups, means to move the said filling-feeder back and forth positively, a bunter, and a transferrer, combined with a filling-fork, its slide, and means actuated thereby, and adapted upon the failure of the filling to cause the bunter to actuate the transferrer, substantially as described.

24. A filling-fork, a filling-fork slide having a connected pivoted latch, and a filling-fork hammer to engage the tail of the filling-fork and move the slide and latch, combined with an additional lever and cam to move it to engage said latch, and impart an additional movement to the said slide, substantially as described.

25. A filling-carrier feeder, a filling-fork, its slide, means to actuate said slide, a slide-rod having a finger, means between the said filling-fork slide and the said slide-rod, and a transferrer to act on and remove the filling-carrier from said feeder, combined with the lay and a connected bunter, whereby when the filling-fork slide is actuated by the absence of the filling, the finger of the slide-rod will be put between the transferrer and the bunter in order that the latter, as the lay comes forward, may actuate the transferrer to operate, substantially as described.

26. A lay having a shuttle-box, and a filling-feeder coöperating with said shuttle-box, said feeder having gear-teeth and provided with a series of filling-carriers, a toothed gear to engage the teeth of said filling-feeder, and means to rotate the said gear and operate the feeder at the proper times, substantially as described.

27. In a loom, the following instrumentalities, viz: a lay, a series of shifting shuttle-boxes, means to actuate the same, a take-up ratchet-wheel, a transferrer, a filling-fork, its slide, a slide-rod having two fingers, means between the said filling-fork slide and said slide-rod to actuate the latter, a bunter carried by the lay, and a filling-carrier feeder, whereby said slide-rod when moved by the filling-fork slide, after failure of the filling, causes one of said fingers to suspend the action of the take-up ratchet-wheel, and then puts the other of said fingers into position to be struck by the said bunter to actuate the transferrer, the said take-up being thrown out of operation in advance of the operation of the transferrer, substantially as described.

28. In a loom for automatically supplying a shuttle in a shuttle-box with a new filling-carrier, a rotatable filling-feeder made as a cage entirely open at its inner end, and a transferrer having its acting end bent to enter said open end of the feeder, combined with means to actuate said feeder and transferrer, substantially as described.

29. In a loom for automatically supplying a shuttle in a shuttle-box with a new filling-carrier, a rotatable filling-feeder made as a cage entirely open at its inner end, a central pivot for the outer end of said cage, and a transferrer having its acting end bent to enter the open end of said feeder, combined with means to actuate said feeder and transferrer, substantially as described.

30. A rotatable filling-feeder having gear-teeth, a pinion engaging said gear-teeth, means to rotate said pinion, and a transferrer to act on the filling-carriers in said feeder, combined with means controlled by said transferrer while acting to remove a filling-carrier to set into operation the devices for rotating said feeder after the removal of a filling-carrier, substantially as described.

31. A filling-feeder adapted to receive and carry a series of filling-carriers; a transferrer, and means to operate it to transfer the said filling-carriers from said feeder, a pattern-surface, a lever, means to move said lever for varying distances, according to the demands of said pattern-surface, and connections between said lever and said feeder to oscillate the latter for variable distances, to place any one of the series of filling-carriers under said transferrer, substantially as described.

32. A lay, having a shuttle-box, a filling-carrier feeder coöperating therewith and adapted to receive and support a series of filling-carriers provided with differing filling, a transferrer, and means to actuate it to transfer a filling-carrier from said feeder into a shuttle in said shuttle-box, a pattern-surface, and means intermediate it and said feeder to move the latter, whereby said feeder may be moved back and forth to keep in working position with relation to said transferrer, a filling-carrier having the desired filling, substantially as described.

33. The lay, its attached bunter, a transferrer having an arm $26^\times$, a slide-rod having a finger, means to put the said finger between the arm of said transferrer and said bunter on the failure of the filling, a filling-feeder carrier, a pawl-rest, a pawl-rest controller actuated by said transferrer, a pawl controlled by said pawl-rest, means to actuate said pawl, a ratchet-wheel actuated by said pawl, and toothed gearing intermediate said ratchet-wheel and said filling-carrier feeder to operate the latter, substantially as described.

34. A pivotally-mounted filling-carrier feeder having gear-teeth and provided with a series of filling-carriers, a toothed gear 31 engaging the teeth of said feeder, said toothed gear carrying a beveled pinion 34, two loose gears, one located at each side of said toothed gear 31 and engaged by the said beveled pinion, combined with a slide-rack, means to operate it, and a transferrer and actuating means therefor, to operate, substantially as described.

35. A pivotally-mounted filling-carrier feeder having geared teeth and provided with a series of filling-carriers, a toothed gear 31 engaging the teeth of said feeder, said toothed gear carrying a beveled pinion 34, two loose gears, one located at each side of said toothed gear 31 and engaged by the said beveled pinion, combined with a toothed gear $32^\times$, a ratchet and pawl, means to move the said pawl to actuate the said ratchet and gear $32^\times$ and rotate the said feeder, combined with a transferrer and means to operate said transferrer, substantially as described.

36. In a loom, the following instrumentalities, viz: a lay having a shuttle-box, a filling-carrier feeder, a transferrer to transfer a filling-carrier from said feeder into a shuttle in said shuttle-box, means to actuate said feeder positively back and forth, a filling-fork, means to operate it on the failure of the filling, to actuate the transferrer, and means intermediate said transferrer and means for rotating said feeder, to move the latter after the transferrer has been operated, substantially as described.

37. In a loom, the following instrumentalities, viz: a lay provided with a shuttle-box, and a bunter, a filling-carrier feeder located at the shuttle-box end of the lay and having a series of filling-carriers, a transferrer coöperating therewith to transfer the said filling-carrier from said feeder into the shuttle in said shuttle-box, a pattern-surface, means to actuate it, a slide-rod operatively connected with the means for actuating said pattern-surface, said slide-rod having a finger, a filling-fork, its slide, and means between said filling-fork slide and actuated by the filling-fork slide on the absence of the filling to move the said slide-rod and effect the stopping of the pattern-surface, and also to put said finger of the slide-rod between said bunter and transferrer, the automatic movement of the slide-rod in the reverse direction after the transferrer has transferred a filling-carrier from the feeder into a shuttle in the shuttle-box, restarting the pattern-surface, substantially as described.

38. In a loom the following instrumentalities, viz: a transferrer, a filling-carrier feeder having a series of filling-carriers provided with filling of different colors, a pattern-surface, and means coöperating with said filling-carrier feeder, and under the control of the said pattern-surface, to positively move said feeder and put in position opposite the transferrer a filling-carrier having a filling of the color called for by said pattern-surface, substantially as described.

39. In a loom the following instrumentalities, viz: a transferrer, a shuttle, a filling-carrier feeder having a series of filling-carriers provided with filling of different colors, a pattern-surface, and means coöperating with said filling-carrier feeder and under the control of the said pattern-surface, to positively move said feeder and put in position opposite the transferrer a filling-carrier having a filling of the color called for by said pattern-surface, and means to actuate said transferrer to transfer a carrier from the feeder into the shuttle on the lay, substantially as described.

40. A lay carrying at one end a shuttle-box, a filling-feeder arranged at the same end of the lay and having gear-teeth and provided with a series of wound masses of filling, a toothed gear to engage the teeth of said feeder, and means to oscillate said gear and feeder, combined with a transferrer and means to actuate it to remove said wound masses of filling from said feeder, substantially as described.

41. A lay having a shuttle-box, a shuttle carried by said lay, a filling-feeder located at the end of the lay and having a series of filling-carriers, a transferrer, and means to actuate it to transfer said filling-carriers from said feeder into a shuttle in said shuttle-box, a pattern-surface, a lever, means to move said lever for varying distances according to the demand of the said pattern-surface, and connections between said lever and said feeder to move the latter for variable distances, to place any one of the series of carriers under said transferrer, substantially as described.

42. A filling-carrier feeder containing a series of filling-carriers having differing filling and arranged in groups, of two or more, combined with a system of epicycloidal gearing to move the said feeder from any one of the filling-carriers in one group to any one of the filling-carriers in an adjacent group, substantially as described.

43. A lay having a shuttle-box, a shuttle carried by the lay, a filling-carrier feeder containing a series of filling-carriers having differing yarns and provided with gear-teeth, and a system of epicycloidal gearing to positively move the said feeder over varying distances, combined with a transferrer, and means to actuate it to transfer a carrier having the desired yarn from said feeder into said shuttle, substantially as described.

In testimony whereof we have signed our names to this specification in the presence of two subscribing witnesses.

HORACE WYMAN.
CHARLES CROMPTON.

Witnesses:
JUSTIN A. WARE,
SAMUEL B. SCHOFIELD.